Sept. 2, 1947.    R. G. SCELI    2,426,752
BACK VIEW ELECTRONIC DEVICE
Filed July 23, 1943

INVENTOR.
RUSSELL G. SCELI.
BY Louis V. Lucia
ATTORNEY.

Patented Sept. 2, 1947

2,426,752

UNITED STATES PATENT OFFICE 2,426,752

BACK-VIEW ELECTRONIC DEVICE

Russell G. Sceli, Canton, Conn.

Application July 23, 1943, Serial No. 495,859

11 Claims. (Cl. 178—6.8)

This invention relates to a back-view electronic device and more particularly to such a device for enabling a person to see a rear view of himself.

The primary object of this invention is to provide an electronic device whereby a person may obtain a clear and undistorted rear view of himself so that he may see the fit of the clothes on his back without having to distort his body as is now necessary in obtaining a view of his back through the usual arrangement of mirrors.

A further object of the invention is to provide such a device having a screen or mirror upon which a person may selectively see a front view and a rear view of himself while standing in front of said screen.

Further objects and advantages of this invention will be more clearly understood from the following description and from the accompanying drawings in which.

Figure 1:
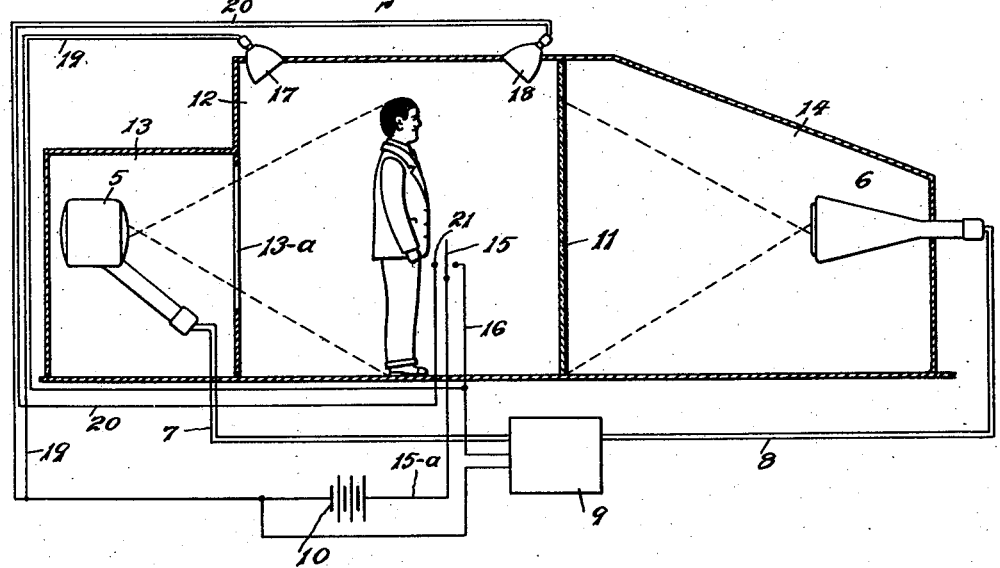
Fig. 1 is a diagrammatic view of the device partly in central vertical section.
Figure 2:
Fig. 2 is a fragmentary detail view, in vertical section, of the screen or mirror embodied in this invention.

As shown in the drawings, the numeral 5 denotes an electronic iconoscope 5, or similar image pick-up device, and an electronic projector tube 6 such as are commonly used in television.

The said iconoscope and tube are connected, in a manner well known to those skilled in the art, by means of conductor wires 7 and 8, to a suitable electronic television instrument 9 which is connected to a suitable source of energy, indicated at 10, through an electric switch 15.

A screen 11 is disposed so as to show thereon the image which is projected by the said projector tube 6.

In the preferred construction shown, I provide a chamber 12 which is shielded from outside light by suitable partitions. The iconoscope 5 is mounted at one side of said chamber within a compartment 13, having an opening 13—a into the chamber 12, and the projector tube 6 is mounted within a housing 14 at the opposite side of the chamber.

The electric circuit for operating the said device may be controlled by a suitable switch, indicated at 15, which is located within the chamber 12 so that it may be conveniently operated by the person while using the device and without distorting his body.

A suitable lighting fixture 17 is provided in the chamber 12 for lighting the back of the person while the iconoscope 5 and the projector tube 6 are in operation, in order that a clear view of the back may be picked up and projected on the screen 11, and another lighting fixture 18 is located at the opposite side of the chamber 12 for lighting the front of the person when he wishes to see a front view of himself as will be hereinafter described.

The said lighting fixture 17 is connected in the electric circuit and directly to the source of energy 10 by means of conductor wires 19—19, one of which extends directly to one side of the source of energy and the other to the opposite side of said source of energy through the conductor wire 16, the switch 15 and the conductor 15—a.

The lighting fixture 18 is connected in said electric circuit by means of wires 20, of which one also extends directly to one side of the source of energy and the other to the opposite side of said source through a third contact member 21, the electric switch 15 and the conductor 15—a.

The screen 11 may consist of a suitable sheet of material which is translucent and on which the side towards the projection tube 6 is frosted in order to show a projected image from the opposite side of the screen, while the said opposite side, which faces the person in the chamber 12, is clear so as to possess reflecting qualities and thereby act as a mirror to show the front of the person when the chamber 14 is darkened and the said front is lighted by the fixture 18.

In the use of my novel device, the person stands within the chamber 12, as clearly shown in Fig. 1, and faces the screen 11. If the person wishes to see a front view of himself, he simply throws the switch 15 into contact with the contact member 21. This closes the electric circuit only to the light fixture 18 which then lights the front of the person so that he can clearly see the front view of himself on the screen 11 which will act as a mirror and reflect light toward the person by reason of the fact that it is dark in the chamber 14 at the rear of the said screen. When the person wishes to see a rear view of himself, he simply throws the switch 15 in the position illustrated in Fig. 1 wherein the electric circuit is closed for the television instrument 9, which includes the iconoscope 5 and the projector tube 6, and thereby the said instrument is rendered operative so that the iconoscope 5 will scan the rear of the person and transmit the image through the wires 7, the instrument 9 and the wires 8 to the projection tube 6 which will project the image against the screen 11. At the same time that the switch 15 is thrown into contact with the contact member 22, the electric circuit to the light fixture 17 will also be closed and the said fixture will be energized to light the rear of the person in order that a clear image will be scanned by the iconoscope 5 and projected by the projector tube 6.

It will be understood that when the chamber 12 is lighted and the chamber 14 is darkened, the screen 11 will act as a mirror on account of the fact that it is not transparent and that the darkness in the chamber 14 will cause the clear surface at the front of the screen to reflect light. When the light image is projected against the frosted side at the rear of the screen 11, it will also show clearly from the front of the said screen.

As will be understood from the foregoing description, my device provides a highly efficient device with which a person, by standing in front of a screen, may obtain either a front or rear view of himself without distorting his body in such a manner that it would prevent the said person from obtaining a view of the normal fit of the clothes on his back.

I claim:

1. A device of the character described comprising the combination of a translucent screen, a television image pick-up device spaced from and facing the front of said screen, and a television projecting device located in back of and directed towards the rear of said screen and connected to said pick-up device for projecting through said screen and on the front thereof a view of the back of a person or object facing said screen and means providing a reflecting surface in combination with said screen for reflecting a front view of said person.

2. In a back-view device of the character described, the combination of a translucent screen, television means including an image pick-up device spaced from and facing one side of said screen, a projector connected to said pick-up device and directed toward the opposite side of the screen for projecting light therethrough whereby the said television means are adapted to show on said screen a view of the back of a person facing a screen from a position between the screen and the pick-up device, means for selectively lighting the front or back of said person while positioned in front of the screen, and control means operatable by said person while in said position.

3. A device of the character described comprising in combination, a chamber having a translucent screen at one side thereof and an opening in the opposite side of said chamber, an electronic pick-up device directed towards said screen through said opening, an electronic projector tube connected to said pick-up device and located at the opposite side of the screen and directed towards the rear thereof to project through said screen and upon the front surface thereof a back view of an object or person in front of and facing the screen between the same and the said pick-up device.

4. A back-view device of the character described comprising a chamber having a screen therein, an electronic pick-up device at one side of and spaced from said screen, a separate chamber at the rear of said screen, a projector tube mounted in said separate chamber, electric circuit means connecting said pick-up device and tube for projecting on said screen a rear view of a person standing in front of the screen and facing the same, lighting means in the first chamber, and circuit control means operable by said person for controlling the operation of said pick-up device and projector tube and of said lighting means; the said screen being normally adapted to reflect light from the front thereof upon darkening of the second chamber, to thereby reflect a front view of said person.

5. A device of the character described comprising a chamber, a screen at one side of said chamber, a separate chamber in back of the screen, an electronic pick-up device facing said screen, and an electronic projector tube in said separate chamber directed towards the rear of said screen; the said screen comprising a sheet of translucent material having the side thereof towards the first chamber adapted to reflect light and the side towards the said separate chamber being non-reflective and adapted to show a light picture therethrough.

6. A pick-up device of the character described comprising a screen, television means including a pick-up device spaced from the front of the screen and a projector at the back of the screen for projecting on said screen the back view of a person positioned between the said screen and pick-up device and facing the screen, the front of said screen being adapted to reflect a front view of the person when the said television means are inoperative, and lighting means for selectively lighting the front and back of said person.

7. A pick-up device as set forth in claim 6 and including an electric circuit for said television and lighting means, and circuit control means positioned between said screen and pick-up device for convenient operation thereof by said person while in said position.

8. A back-view device of the character described comprising a screen, television means including a pick-up device at one side of said screen and a projector at the opposite side of said screen for showing on said screen a back view of a person positioned in front of and facing the screen, lighting means directed toward the back of said person and operative during the operation of said television means, lighting means directed toward the front of said person and operative when the said television means is inoperative, and means for selectively controlling said lighting and television means; said controlling means being located for operation by said person without bodily distortion while in front of and facing said screen.

9. A back-view device of the character described comprising a screen, television means including an image pick-up device located at one side of said screen and spaced therefrom and a projector at the opposite side of said screen for projecting a rear view of a person positioned in front of and facing the screen between the same and the pick-up device, lighting means directed towards the front of the person, lighting means directed towards the back of the person, and electric circuit control means for selectively controlling the operation of said television means and lighting means; the said screen being adapted to show an image projected thereon by said tube and to reflect light from the front thereof to thereby show a front view of the person facing the said screen; the said controlling means including an electric switch adapted to close an electric circuit including said television means and the lighting means directed toward the back of the person, or to break said circuit and close a separate circuit including the light directed toward the front of the person.

10. A back-view device of the character described comprising a screen, television means including a device adapted to pick up the back view of a person positioned in front of and facing said screen, the front of said screen being adapted to reflect light so as to act as a mirror to show the front view of the person when the television means are inoperative, and an electric circuit for said television means and including lighting means for lighting the back of said person and separate lighting means for lighting the front of said person while in said position, and means for selectively controlling said circuit for operation of said television and light means; said circuit controlling means including a switch having a contact member for closing the circuit to the television means and the light means for lighting the back of the person, and a separate contact member for closing the circuit only to the light means for lighting the front of the person.

11. A device of the character described comprising in combination, a translucent screen having a reflective front surface, an electronic pickup device spaced from and directed towards the front of said screen, and a projecting device directed towards the back of said screen.

RUSSELL G. SCELI.

REFERENCES CITED

The following references are of record in the file of this patent:

UNITED STATES PATENTS

| Number | Name | Date |
|---|---|---|
| 2,061,378 | Henze et al. | Nov. 17, 1936 |
| 2,274,710 | Knoop | Mar. 3, 1942 |

FOREIGN PATENTS

| Number | Country | Date |
|---|---|---|
| 448,476 | France | Nov. 27, 1912 |